US012671697B2

(12) United States Patent
Zohar et al.

(10) Patent No.: US 12,671,697 B2
(45) Date of Patent: Jun. 30, 2026

(54) DETERMINING EXISTENCE OF A NETWORK ATTACK

(71) Applicant: Mellanox Technologies Ltd., Yokneam (IL)

(72) Inventors: Ohad Zohar, Haifa (IL); Dotan Finkelshtein, Yokneam Illit (IL); Ariel Almog, Kohav Yair (IL); Nir Getter, Yokneam (IL); Amit Mandelbaum, Tegoa (IL)

(73) Assignee: Mellanox Technologies Ltd., Yokneam (IL)

( * ) Notice: Subject to any disclaimer, the term of this patent is extended or adjusted under 35 U.S.C. 154(b) by 333 days.

(21) Appl. No.: 17/682,209

(22) Filed: Feb. 28, 2022

(65) Prior Publication Data

US 2023/0275906 A1     Aug. 31, 2023

(51) Int. Cl.
| | |
|---|---|
| *H04L 9/40* | (2022.01) |
| *G06F 9/455* | (2018.01) |
| *G06N 20/00* | (2019.01) |
| *H04L 15/16* | (2006.01) |

(52) U.S. Cl.
CPC ...... *H04L 63/1416* (2013.01); *G06F 9/45558* (2013.01); *G06N 20/00* (2019.01); *H04L 63/1425* (2013.01); *H04L 63/1466* (2013.01); *G06F 2009/45587* (2013.01); *G06F 2009/45595* (2013.01)

(58) Field of Classification Search
CPC ............. H04L 63/1416; H04L 63/1425; H04L 63/1466; H04L 63/1408; H04L 63/1458; G06F 9/45558; G06F 2009/45587; G06F 2009/45595; G06F 2009/45591; G06F 21/554; G06F 21/566; G06F 21/73; G06N 20/00; G06N 5/01; G06N 20/20
USPC .......................................................... 726/22
See application file for complete search history.

(56) References Cited

U.S. PATENT DOCUMENTS

| | | | | | |
|---|---|---|---|---|---|
| 7,818,795 B1 * | 10/2010 | Arad | ................... | H04L 63/1408 |
| | | | | | 726/13 |
| 8,813,240 B1 * | 8/2014 | Northup | .................. | G06F 21/53 |
| | | | | | 726/25 |

(Continued)

FOREIGN PATENT DOCUMENTS

WO     WO-2019229492 A1 * 12/2019     ........... H04L 67/146

OTHER PUBLICATIONS

Solution Brief, Intel vPro Platform Hardware Assisted Ransomware Detection (Detect Ransomware and other Advanced Threats with Intel Threat Detection Technology ; downloaded on Nov. 23, 2021.

(Continued)

*Primary Examiner* — Berhanu Shitayewoldetadik
(74) *Attorney, Agent, or Firm* — PEARL COHEN ZEDEK LATZER BARATZ LLP

(57) ABSTRACT

A method of determining if a virtual machine is executing a network attack may include using a computing device operating a processor: receiving a plurality of jobs from a plurality of virtual machines being executed across time slices on a host computer in a computer network; executing the plurality of jobs using the processor; receiving data from hardware counters of the processor; and based on the data, determining whether or not a virtual machine of the plurality of virtual machines is executing a network attack.

18 Claims, 3 Drawing Sheets

(56)                References Cited

U.S. PATENT DOCUMENTS

| | | | | |
|---|---|---|---|---|
| 9,015,838 | B1 * | 4/2015 | Northup | G06F 21/554 |
| | | | | 713/188 |
| 9,537,829 | B2 * | 1/2017 | Wang | H04L 63/04 |
| 9,766,693 | B2 * | 9/2017 | Saxena | G06F 9/45558 |
| 10,242,665 | B1 * | 3/2019 | Abeloe | B60W 30/0956 |
| 10,387,992 | B2 * | 8/2019 | Appu | G06T 15/005 |
| 10,802,488 | B1 * | 10/2020 | Abeloe | G06N 3/084 |
| 11,443,035 | B2 * | 9/2022 | Chhabra | H04L 67/306 |
| 2007/0285709 | A1 * | 12/2007 | Yamasaki | G06F 3/1214 |
| | | | | 358/1.15 |
| 2008/0177756 | A1 * | 7/2008 | Kosche | G06F 11/3447 |
| 2012/0323509 | A1 * | 12/2012 | Chen | G06F 1/28 |
| | | | | 702/60 |
| 2014/0059312 | A1 * | 2/2014 | Uno | G06F 9/45558 |
| | | | | 711/162 |
| 2016/0180068 | A1 * | 6/2016 | Das | H04L 63/0861 |
| | | | | 726/7 |
| 2016/0246961 | A1 * | 8/2016 | Wang | G06F 21/53 |
| 2017/0134403 | A1 * | 5/2017 | Hearn | H04L 63/1425 |
| 2017/0177393 | A1 * | 6/2017 | Gao | G06F 9/505 |
| 2017/0199564 | A1 * | 7/2017 | Saxena | G06F 1/3296 |
| 2017/0337076 | A1 * | 11/2017 | Gao | G06F 9/5038 |
| 2020/0327222 | A1 * | 10/2020 | Chhabra | H04L 63/0421 |
| 2020/0334064 | A1 * | 10/2020 | Jiang | G06F 13/4282 |
| 2021/0113921 | A1 * | 4/2021 | Musbah | A63F 13/355 |
| 2021/0142206 | A1 * | 5/2021 | Ghanea-Hercock | |
| | | | | G06F 21/602 |
| 2021/0157945 | A1 * | 5/2021 | Cobb | H04L 63/0227 |
| 2021/0182404 | A1 * | 6/2021 | Shackleton | G06F 9/45558 |
| 2021/0204207 | A1 * | 7/2021 | Fiorese | H04L 67/146 |
| 2021/0314350 | A1 * | 10/2021 | Finkelshtein | H04L 63/1466 |
| 2021/0374754 | A1 * | 12/2021 | Pandian | G06N 3/08 |
| 2021/0406218 | A1 * | 12/2021 | Margolin | G06N 3/08 |
| 2022/0176244 | A1 * | 6/2022 | Musbah | A63F 13/35 |
| 2022/0351024 | A1 * | 11/2022 | Khayrallah | G06N 3/063 |

OTHER PUBLICATIONS

Product Brief; Hardware-enhanced Threat Detection; downloaded on Nov. 23, 2021.
White Paper; Intel Hardware Shield Overview; downloaded on Nov. 23, 2021.

* cited by examiner

100

200

302

Receiving a plurality of jobs from a plurality of virtual machines being executed across time slices on a host computer in a computer network

304

Executing the plurality of jobs using the processor

306

Receiving data from hardware counters of the processor

308

Based on the data, determining whether or not a malicious virtual machine is executing a network attack

DETERMINING EXISTENCE OF A NETWORK ATTACK

FIELD OF THE INVENTION

The present invention relates to the field of methods of determining a network attack, and more particularly, to methods of determining a network attack based on measures of hardware-related activities of a computing device.

BACKGROUND OF THE INVENTION

Current methods of determining if a network attack exists are based on measures of software-related activities in a computer network. Typically, such methods rely on pre-defined thresholds. For example, if it is determined that the measures of software-related activities exceed predefined static thresholds, an event may be determined as a network attack. However, static threshold based methods may have relatively high false possible rates as accurate predefinition of the static thresholds is not always possible.

SUMMARY OF THE INVENTION

Some embodiments may determine if a virtual machine is executing a network attack using a computing device operating a processor receiving a plurality of jobs from a plurality of virtual machines being executed across time slices on a host computer in a computer network; executing the plurality of jobs using the processor; receiving data from hardware counters of the processor; and based on the data, determining whether or not a virtual machine of the plurality of virtual machines is executing a network attack.

The data from the hardware counters of the processor may be indicative of counts of hardware-related activities of the processor.

Some embodiments may include: based on the data, associating at least a portion of the counts of hardware-related activities of the processor with a virtual machine of the plurality of virtual machines; and determining whether or not the respective virtual machine is executing the net-work attack is based on the counts of hardware-related activities associated with the respective virtual machine.

Some embodiments may include, if it is determined that a virtual machine is executing a network attack, transmitting information concerning or describing the respective virtual machine or the attack to an authorized entity.

Some embodiments may include, if it is determined that a virtual machine is executing a network attack, terminating the respective virtual machine.

In some embodiments, the computing device is a network interface controller.

In some embodiments, the determining may include providing the data to a machine learning algorithm.

In some embodiments, the determining may include providing the data to a machine learning classifier algorithm.

Some embodiments of the present invention may provide a device, the device may include: a memory; and one or more processors to: receive a plurality of jobs from a plurality of virtual machines being executed across time slices on a host computer in a computer network; execute the plurality of jobs; receive data from hardware counters of the one or more processors; and based on the data, determine whether or not a virtual machine of the plurality of virtual machines is executing a network attack.

In some embodiments, the data from the hardware counters of the processor is indicative of counts of hardware-related activities of the processor.

In some embodiments, the one or more processors to: based on the data, associate at least a portion of the counts of hardware-related activities of the one or more processors with a virtual machine of the plurality of virtual machines; and determine whether or not the respective virtual machine is executing the network attack based on the counts of hardware-related activities associated with the respective virtual machine.

In some embodiments, if the one or more processors determine that a virtual machine is executing a network attack, the one or more processors to transmit information concerning the respective virtual machine to an authorized entity.

In some embodiments, if the one or more processors determine that a virtual machine is executing a network attack, the one or more processors to terminate the respective virtual machine.

In some embodiments, the device is a network interface controller.

In some embodiments, the one or more processors determine whether or not a virtual machine is executing a network attack by providing the data to a machine learning algorithm.

Embodiments may include a system including a host computer executing a plurality of processes; and a network interface controller (NIC) to: receive a plurality of jobs from one or more the plurality of processes; execute the plurality of jobs; and receive data from hardware counters of the NIC, the data is indicative of counts of hardware-related activities of the NIC; and wherein the NIC or the host computer to determine, based on the data, whether or not a process of the plurality of processes is executing a network attack on the NIC.

In some embodiments, the MC or the host computer to, based on the data, associate at least a portion of the counts of hardware-related activities of the NIC with a process of the plurality of processes; and determine whether or not the respective process is executing the network attack based on the counts of hardware-related activities associated with the respective process.

If the NIC or the host computer determines that a process is executing a network attack, the NIC or the host computer may transmit information concerning the respective process to an authorized entity.

If the NIC or the host computer determines that a process is executing a network attack, the NIC or the host computer may terminate the respective process. In some embodiments, the NIC or the host computer determines whether or not a process is executing a network attack by providing the data to a machine learning algorithm.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
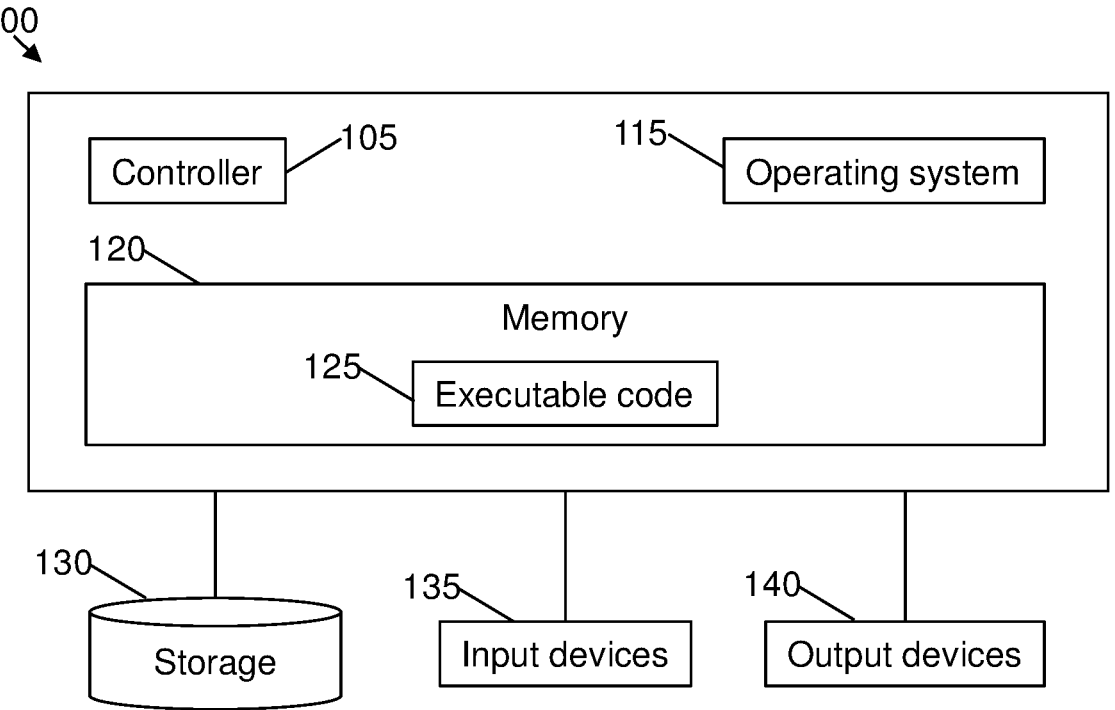
FIG. 1 is a block diagram of an exemplary computing device which may be used with embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

A malicious virtual machine executing a network attack on, for example, a network interface controller (NIC) may consume significant portion of processing resources of the NIC, thus making the NIC unavailable to other processes or virtual machines. Embodiments of the present invention provide a method of determining if a malicious virtual machine or other process is executing a network attack on the NIC based on measures of hardware-related activities of the NIC while considering changing (e.g., constantly changing) loads on the NIC.

Reference is now made to FIG. 1, which is a block diagram of an exemplary computing device which may be used with embodiments of the present invention.

Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment shown in FIG. 2 such as host computer 210 and NIC 230 may be or include a computing device such as included in FIG. 1, although various units among these entities may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g., code 125), and/or data such as user responses, interruptions, etc.

Executable code 125 may be any executable code, e.g., an application, a program, a process, task or script. Executable code 125 may be executed by controller 105 possibly under control of operating system 115. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card, a modem, printer or facsimile machine, a universal serial bus (USB) device or external hard drive may be included in input devices 135 and/or output devices 140.

Embodiments of the invention may include one or more article(s) (e.g., memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
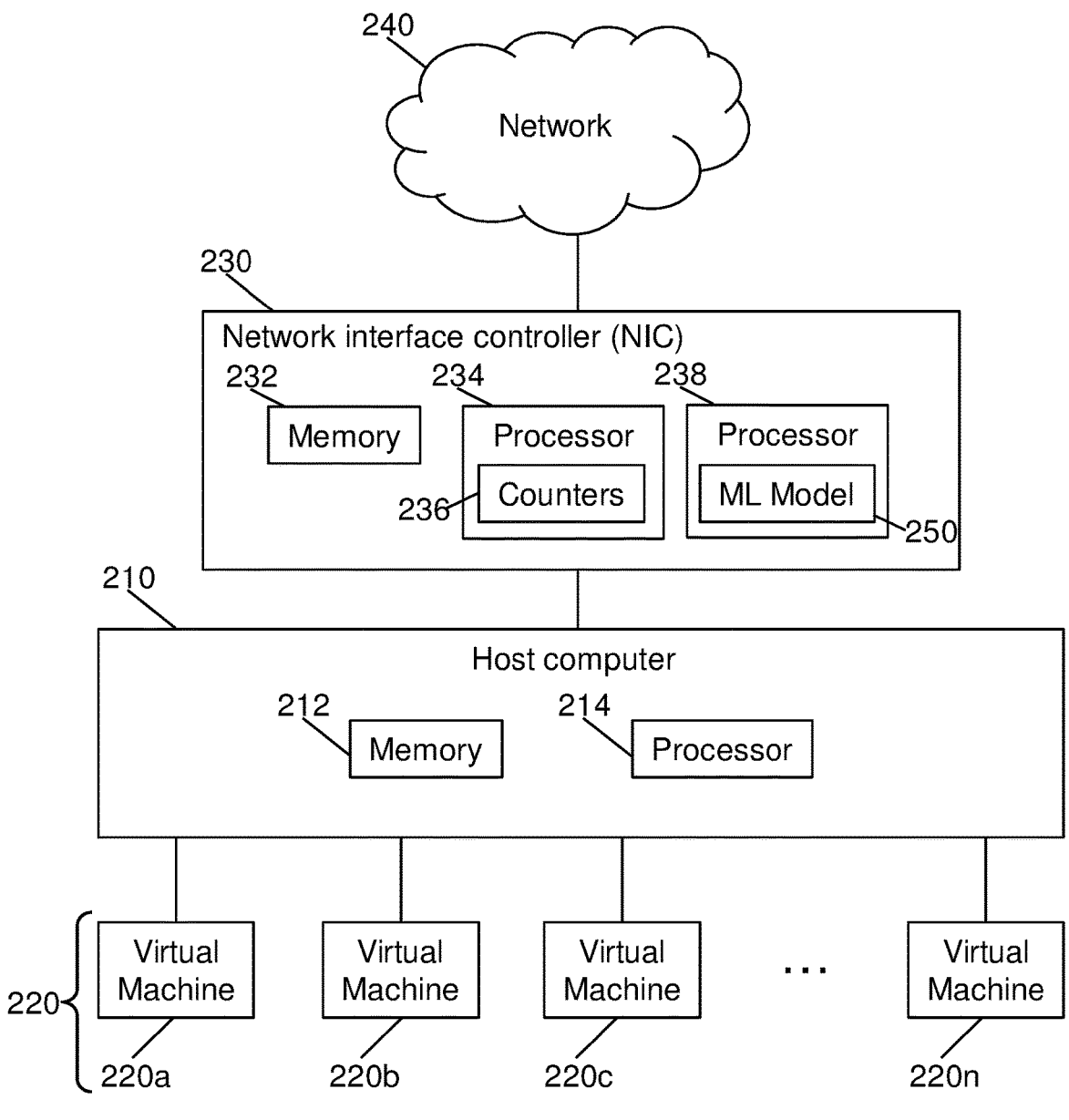
FIG. 2 is a block diagram of a system capable of determining existence of a network attack, according to some embodiments of the present invention.

Reference is now made to FIG. 2, which is a block diagram of a system 200 capable of determining existence of a network attack, according to some embodiments of the present invention. Elements and modules of FIG. 2 may be or may be executed by a computer system such as shown in the example of FIG. 1.

System 200 may include a host computer or hypervisor 210. Host computer or hypervisor 210 may include a memory 212 (e.g., such as memory 125 described above with respect to FIG. 1) and a processor 214 (e.g., such as controller 105 described above with respect to FIG. 1). Host computer or hypervisor 210 may execute a plurality of processes such as virtual machines 220a, 200b, 220c . . . 220n (referred herein as "virtual machines 220"). Such execution may be organized across time slices (e.g., regular divisions of time, such that processor 214 executing the virtual machines switches execution among different virtual machines across time slices). Each virtual machine may be a virtualization or emulation of a computer system, which virtually executes other processes. A virtual machine may be based on a real physical computer architecture and provide functionality of that physical architecture to a process. While virtual machines are described as an example process, other processes performing attacks on a NIC may be detected by embodiments of the present invention.

System 200 may include a network interface controller (NIC) 230. NIC 230 may include a memory 232 (e.g., such as memory 125 described above with respect to FIG. 1) and one or more processors. For example, NIC 230 may include a processor 234 (e.g., such as controller 105 described above with respect to FIG. 1), and in some embodiments one or more additional processors, for example to execute machine learning models or other functions, such as a processor 238 (e.g., a RISC-V processor; as schematically shown in FIG. 2). NIC 230 may provide access for virtual machines 220 or other processes to a computer network 240 (e.g., the internet or the "cloud"). Processor 234 of NIC 230 may receive a plurality of jobs or packets from virtual machines 220. Processor 234 may execute the plurality of jobs being received from virtual machines 220 or other processes. The jobs may, for example, include opening or closing queue pairs (e.g., send and receive pairs) responsible for scheduling processor work, send or fetch work queue elements or any other jobs known in the art. Processor 234 may include hardware counters 236. Hardware counters 236 may generate data indicative of counts of hardware-related activities of processor 234 of NIC 230. The data generated by hardware counters 236 may, for example, indicate which of virtual machines 220 is consuming processing slices of which internal units of NIC 230 and for what period of time.

Processor 234 or processor 238 of NIC 230, or processor 214 of host computer 210, may determine, based on the data from hardware counters 236, whether or not a virtual machine of virtual machines 220 is executing a network attack on MC 230 (e.g., whether or not the virtual machine is malicious), for example as described hereinbelow.

Based on the data from hardware counters 236, at least a portion of the counts of hardware-related activities of processor 234 may be associated with a virtual machine of virtual machines 220. For example, at least a portion of the counts of hardware-related activities may be associated with the respective virtual machine by determining which of the counts of hardware-related activities of processor 234 are caused by execution of jobs received from the respective virtual machine. Based on the counts of hardware-related activities associated with the respective virtual machine, it may be determined whether or not the respective virtual machine or other process is the malicious virtual machine that is executing the network attack.

If it is determined that a virtual machine or other process is executing a network attack, an action may be taken, such as terminating the respective virtual machine or causing host computer or hypervisor 210 to terminate the respective virtual machine.

In some embodiments, if it is determined that a virtual machine is executing a network attack, information concerning or describing the respective virtual machine or the attack may be transmitted to an authorized entity (e.g., computer or hypervisor 210 or a cloud telemetry endpoint). In various embodiments, in response to a determination of an attack, the authorized entity may terminate the respective virtual machine or cause host computer or hypervisor 210 to terminate the respective virtual machine.

In some embodiments, it may be determined whether or not a virtual machine is executing a network attack by providing the data from hardware counters 236 of processor 234 of NIC 230 to a machine learning model 250. Machine learning model 250 may be a software model that may be executed by a processor, such as processor 234 or processor 238 of NIC 230, or processor 214 of host computer 210. For example, the data from hardware counters 236 of processor 234 may be converted into an input vector which is input to machine learning model 250. In one example, the input vector may include a plurality of values, wherein each of the values may indicate one of the counts of hardware related activities of processor 234 associated with one of virtual machines 220 (e.g., as described hereinabove). Machine learning model 250 may determine based on the input vector whether or not a virtual machine of virtual machines 220 is executing a network attack. In some embodiments, machine learning model 250 may include a machine learning classifier model. For example, the machine learning classifier model may include a decision tree model, e.g., a decision tree boosting model. In the example of the decision tree model, based on the input vector, the decision tree model may answer a series of questions to determine an output indicating whether or not a virtual machine is executing a network attack.

In some embodiments, machine learning model 250 may be trained by generating real-world network attacks. For example, in a training process, a supervisor may cause a virtual machine or other process of virtual machines 220 or other processes to execute a network attack on NIC 230 by transmitting a plurality of malicious jobs or packets to be executed by processor 234 of NIC 230. Data from hardware counters 236 may be obtained and an input vector labelled or tagged with a correct output (e.g., which of virtual machines 220 is executing the network attack and which is not) may be generated based on the data. This process may be repeated a plurality of times. Each time the process is repeated, a different virtual machine of virtual machines 220 may be selected as a malicious virtual machine, different number of malicious and/or non-malicious jobs or packets may be transmitter to NIC 230 or any other parameter may be changed to train the machine learning model to determine whether or not a virtual machine is executing a network attack while considering changing (e.g., constantly changing) loads on processor 234 of NIC 230.

Figure 3:
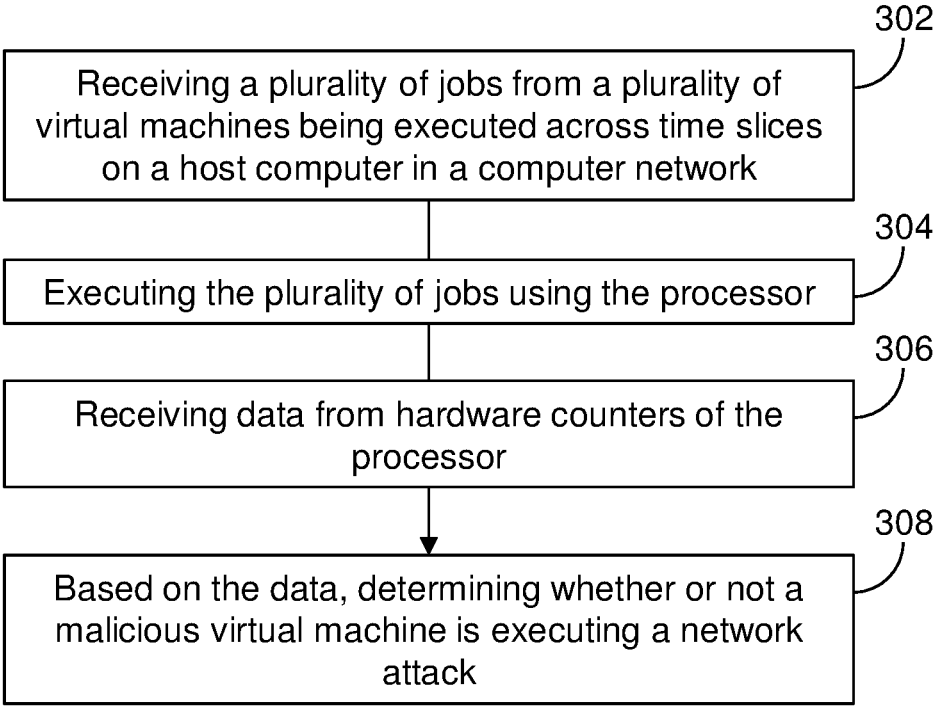
FIG. 3 is a flowchart of a method of determining if a virtual machine is executing a network attack, according to some embodiments of the invention.

Reference is now made to FIG. 3, which is a flowchart of a method of determining if a virtual machine is executing a network attack, according to some embodiments of the invention.

The method may be performed using a computing device, such as the computing devices described with respect to FIGS. 1 and 2, but other systems may be used.

In operation 302, a plurality of jobs or tasks may be received by a processor from a plurality of virtual machines or other processes being executed across time slices on a host computer in a computer network. For example, the processor may be processor 234 of NIC 230, the host computer may be host computer or hypervisor 210 and the virtual machines may be virtual machines 200 described above with respect to FIG. 2.

In operation 304, the plurality of jobs may be executed using the processor.

In operation 306, data may be received from the processor, for example from hardware counters of the processor. Data may be received from other processor sources. For example, the hardware counters may be hardware counters 236 described above with respect to FIG. 2. The hardware counters may be indicative of counts of hardware-related activities of the processor.

In operation 308, based on the data, it may be determined whether or not a virtual machine is executing a network attack (e.g., as described above with respect to FIG. 2).

In some embodiments, at least a portion of the counts of hardware-related activities of the processor may be associated with a virtual machine of the plurality of virtual machines (e.g., as described above with respect to FIG. 2).

For example, at least a portion of the counts of hardware-related activities may be associated with the respective virtual machine by determining which of the counts of hardware-related activities of the processor are caused by execution of jobs received from the respective virtual machine (e.g., as described above with respect to FIG. 2). It may be determined whether or not the respective virtual machine is executing the network attack based on the counts of hardware-related activities associated with the respective virtual machine (e.g., as described above with respect to FIG. 2).

If it is determined that a virtual machine is executing a network attack (e.g., that the virtual machine is malicious), the respective virtual machine may be terminated (e.g., as described above with respect to FIG. 2).

If it is determined that a virtual machine is executing a network attack (e.g., that the virtual machine is malicious), information concerning the respective virtual machine may be transmitted to an authorized entity (e.g., as described above with respect to FIG. 2).

If it is not determined that an attack is occurring, monitoring of the counts of hardware-related activities of the processor may continue based on date from the hardware counters of the processor (e.g., as describe hereinabove).

Determining whether or not a virtual machine is executing a network attack may include providing the data to a machine learning model (e.g., as described above with respect to FIG. 2). In some embodiments, the machine learning model may include a machine learning classifier model. The machine learning classifier model may include a decision tree model. A decision tree model may include a decision tree boosting model. A machine learning model may be trained (e.g., as described above with respect to FIG. 2). A machine learning model may learn complex patterns among multiple data points so as to be able to provide a classification (e.g., malicious/not malicious) based on a data pattern as opposed to simply one or more thresholds.

Advantageously, embodiments may determine if a virtual machine is executing a network attack on a NIC in a computer network based on counts of hardware-related activities of the NIC while considering changing (e.g., constantly changing) loads on the NIC.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of determining if a virtual machine is executing a network attack, the method comprising, using a computing device operating a processor:

receiving a plurality of jobs from a plurality of virtual machines being executed across time slices on a host computer in a computer network;

executing the plurality of jobs using the processor;

receiving counts of hardware-related activities from hardware counters of the processor;

determining which of the counts of hardware-related activities are caused by execution of jobs of the plurality of jobs received from a respective virtual machine, the determination indicating which virtual machine of the plurality of virtual machines is consuming processing slices of which internal units of the computing device and for what period or periods of time; and based on the processing slices consumed by each of the virtual machines of the plurality of virtual machines and the period or periods of time, determining whether or not a virtual machine of the plurality of virtual machines is executing a network attack.

2. The method of claim 1, wherein if it is determined that a virtual machine is executing a network attack, transmitting information concerning the respective virtual machine to an authorized entity.

3. The method of claim 1, comprising, if it is determined that a virtual machine is executing a network attack, terminating the respective virtual machine.

4. The method of claim 1, wherein the computing device is a network interface controller.

5. The method of claim 1, wherein the determining comprises providing the counts of hardware-related activities to a machine learning algorithm.

6. The method of claim 1, wherein the determining comprises providing the counts of hardware-related activities to a machine learning classifier algorithm.

7. The method of claim 1, wherein based on the counts of hardware-related activities, determining whether or not the virtual machine of the plurality of virtual machines is executing the network attack comprises providing the counts of hardware-related activities to a machine learning algorithm trained to determine whether or not the virtual machine is executing the network attack.

8. A device comprising:

a memory; and one or more processors to:

receive a plurality of jobs from a plurality of virtual machines being executed across time slices on a host computer in a computer network;

execute the plurality of jobs;

receive counts of hardware-related activities from hardware counters of the one or more processors;

determine which of the counts of hardware-related activities are caused by execution of jobs of the plurality of jobs received from a respective virtual machine of the plurality of virtual machines, the determination indicating which virtual machine of the plurality of virtual machines is consuming processing slices of which internal units of the one or more processors and for what period or periods of time; and based on the processing slices consumed by each of the virtual machines of the plurality of virtual machines and the period or periods of time, determine whether or not a virtual machine of the plurality of virtual machines is executing a network attack.

9. The device of claim 8, wherein if the one or more processors determine that a virtual machine is executing a network attack, the one or more processors to transmit information concerning the respective virtual machine to an authorized entity.

10. The device of claim 8, wherein if the one or more processors determine that a virtual machine is executing a network attack, the one or more processors to terminate the respective virtual machine.

11. The device of claim 8, wherein the device is a network interface controller.

12. The device of claim 8, wherein the one or more processors to determine whether or not a virtual machine is executing a network attack by providing the counts of hardware-related activities to a machine learning algorithm.

13. The device of claim 8, wherein the one or more processors is to: based on the counts of hardware-related activities, determine whether or not the virtual machine of the plurality of virtual machines is executing the network attack by providing the counts of hardware-related activities to a machine learning algorithm trained to determine whether or not the virtual machine is executing the network attack.

14. A system comprising:

a host computer executing a plurality of processes; and a network interface controller (NIC) to:

execute a plurality of jobs received from one or more of the plurality of processes;

receive counts of hardware-related activities from the NIC;

wherein the NIC or the host computer is to determine which of the counts of hardware-related activities are caused by execution of jobs of the plurality of jobs received from a respective process of the plurality of processes, wherein the determination indicates which process of the plurality of processes is consuming processing slices of which internal units of the NIC and for what period or periods of time; and wherein the NIC or the host computer is to determine, based on the processing slices of internal units of the NIC consumed by each of the processes of the plurality of processes and the period or periods of time, whether or not a process of the plurality of processes is executing a network attack on the NIC by providing the counts of hardware-related activities to a machine learning algorithm trained to determine whether or not the process is executing the network attack based on the counts of hardware-related activities.

15. The system of claim 14, wherein the NIC or the host computer is to:

based on the counts of hardware-related activities, associate at least a portion of the counts of hardware-related activities of the NIC with a process of the plurality of processes; and determine whether or not the respective process is executing the network attack based on the counts of hardware-related activities associated with the respective process.

16. The system of claim 14, wherein if the NIC or the host computer determines that a process is executing a network attack, the NIC or the host computer to transmit information concerning the respective process to an authorized entity.

17. The system of claim 14, wherein if the NIC or the host computer determines that a process is executing a network attack, the NIC or the host computer to terminate the respective process.

18. The method of claim 7, comprising:

causing a virtual machine of the plurality of virtual machines to execute a network attack on the processor;

obtaining training data from the hardware counters, the data comprising counts of hardware-related activities;

generating an input vector based on the training data and a label indicating which of the plurality of virtual machines is executing the network attack and which is not; and using the input vector to train the machine learning algorithm.

* * * * *